United States Patent [19]

Shore

[11] Patent Number: 4,492,481
[45] Date of Patent: Jan. 8, 1985

[54] THRUST BEARING STARTER APPARATUS

[75] Inventor: David J. Shore, Clarence, N.Y.

[73] Assignee: Westinghouse Electric Corp., Pittsburgh, Pa.

[21] Appl. No.: 437,373

[22] Filed: Oct. 28, 1982

[51] Int. Cl.³ .................... F16C 17/10; F16C 19/50; F16C 21/00; F16C 39/04

[52] U.S. Cl. .................... 384/228; 384/121; 384/126; 384/229; 384/302; 384/453

[58] Field of Search ............. 384/99, 102, 101, 121, 384/124, 126, 228, 229, 247, 248, 251, 274, 303–312, 193–201; 308/174–176, 1 A, 227–231

[56] References Cited

U.S. PATENT DOCUMENTS

| | | |
|---|---|---|
| 2,191,901 | 2/1940 | Wallgren . |
| 2,813,761 | 11/1957 | Pilarczyk .................... 384/311 |
| 3,586,400 | 6/1971 | Wallin .................... 384/305 |
| 3,635,533 | 1/1972 | Galloway . |
| 3,910,650 | 10/1975 | Kraus . |
| 4,000,559 | 1/1977 | Korrenn et al. . |
| 4,084,862 | 4/1978 | Ishida et al. . |

FOREIGN PATENT DOCUMENTS

| | | | |
|---|---|---|---|
| 204335 | 7/1959 | Austria .................... | 384/303 |
| 647799 | 2/1979 | U.S.S.R. .................... | 384/102 |

Primary Examiner—Stuart S. Levy
Assistant Examiner—Thomas R. Hannon
Attorney, Agent, or Firm—G. H. Telfer

[57] ABSTRACT

A thrust bearing assembly is provided which reduces initial axial loading on a shaft's thrust bearing in order to correspondingly reduce the required torque for rotational start-up. The shaft's bearing runner is forced in a direction away from its associated thrust bearing during initial start-up procedures by a suitable means for imparting a force on the bearing runner in a direction away from the thrust bearing. The force is provided by a piston and cylinder combination, in the preferred embodiment, which provides an axial force in a direction opposing the initial shaft loading force. An antifriction guide bearing is used to transfer this force from the piston to the shaft and, in turn, to the bearing runner.

1 Claim, 3 Drawing Figures

THRUST BEARING STARTER APPARATUS

BACKGROUND AND SUMMARY OF THE INVENTION

The present invention relates generally to thrust bearing assemblies and, more particularly, to a starter apparatus which temporarily reduces the normal force between a thrust bearing and its associated runner during startup.

Thrust bearings are commonly utilized on rotating machinery such as large vertical-axis motors and hydrogenerators to prevent axial movement of the machinery's rotor. These thrust bearings generally have a static friction which is much higher than their dynamic friction. This is due to the relative dryness of the interface between the thrust bearing and its associated runner when in a static condition as compared to the wetted interface of an operating thrust bearing system, which benefits from a lower coefficient of friction because of the presence of a thin layer of oil located therebetween.

Due to this relative dryness, it is sometimes difficult to initiate the rotation of the bearing's associated rotor member when the bearing is under a high axial load. When the axial load on the thrust bearing is sufficiently high relative to the starting torque of the associated motor or generator, the static friction of the thrust bearing cannot be overcome and the associated machine will therefore not start.

The relationship between this normal force N and the resulting frictional force F is defined as $$F = fN \qquad (1)$$

where f is the coefficient of friction between the thrust bearing and its associated bearing runner at the interface described above. As can be readily determined from the above equation, the frictional force F can be reduced by reducing either the coefficient of friction f or the normal force N.

This rotor starting problem is generally overcome with a hydraulic lift system which takes the approach of reducing the coefficient of friction f of the above equation. This type of lift system forces high-pressure oil into the interface between the bearing shoes and the shaft runner. The presence of oil between these adjacent surfaces reduces the coefficient of static friction therebetween and therefore reduces the minimum torque required to start the rotation of the associated rotor. Hydraulic lift systems typically require complicated labor-intensive installation and expensive parts, which include manifolds, orifices, check valves, hydraulic piping and fittings. The bearings themselves generally require special machining operations to be compatible with hydraulic lift systems. Also, the spatial requirements of hydraulic lift systems occasionally exceed the volume capacity of some bearing housings.

The present invention, rather than attempting to reduce the coefficient of friction between the adjacent surfaces of the bearing and shaft runner, temporarily reduces the normal force N between these two adjacent components. A thrust bearing assembly made in accordance with the present invention replaces the hydraulic lift system with means for imparting an axial force on the shaft, such as a shaft displacement cylinder, and an anti-friction bearing. High-pressure oil is supplied to a hydraulic cylinder which exerts an axial force on the rotor shaft in a direction which opposes and reduces the normal force N between the thrust bearing and its runner. Therefore, the pressure between the axial bearing and its adjacent shaft runner is relieved and, since the normal force N between the bearing and its runner is reduced, the static friction F is also reduced. This reduction of the friction force F between the bearing and its runner reduces the starting torque required for overcoming static friction and initiating rotation of the rotor shaft.

The present invention provides a thrust bearing starter assembly which is also much simpler to assemble and maintain than hydraulic lift systems and which utilizes parts which are less expensive and easier to install than comparative high-pressure oil systems as utilized to incorporate the hydraulic lift concept.

BRIEF DESCRIPTION OF THE DRAWING

The present invention will be better understood from a reading of the description of the preferred embodiment in conjunction with the figures, in which.

DESCRIPTION OF THE PREFERRED EMBODIMENT

Figure 1:
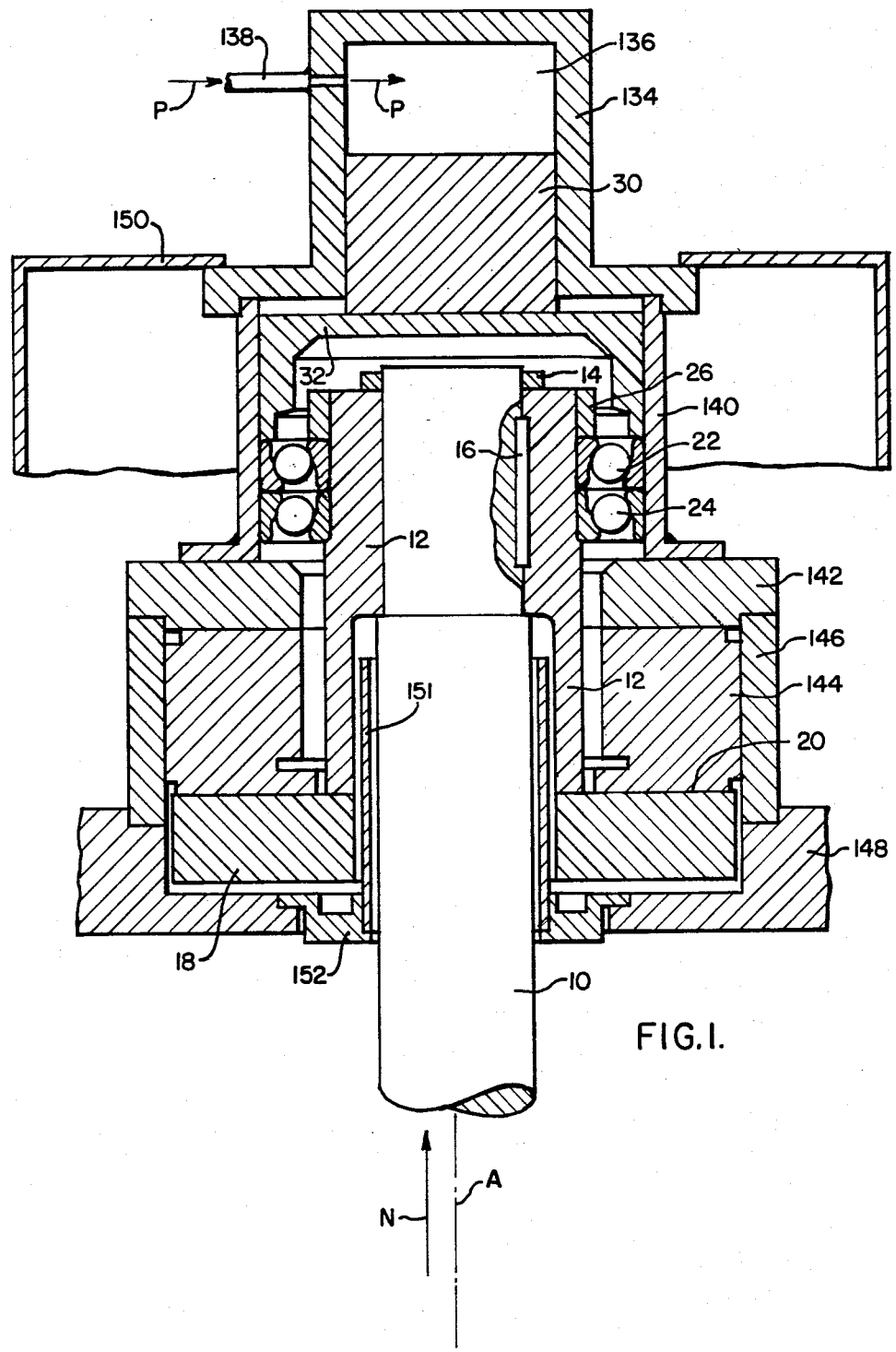
FIG. 1 illustrates a rotating machine utilizing the thrust bearing starter assembly of the present invention in a deactivated mode.

The present invention relates generally to thrust bearings and, more particularly, to a thrust bearing assembly which utilizes a means for exerting an axial force on a rotor in order to decrease the normal force between that rotor's shaft runner and its adjacent thrust bearing.

In the following description of the present invention, components which are intended to be capable of axial movement will be designated with reference numerals less than 99, and components which are not intended to be capable of axial movement will be designated with reference numerals greater than 100. This convention is being used to clarify the description of the present invention. However, it should be understood that axial motion of these axially movable components is not a requirement of the present invention. All that is required by the present invention is that a force be able to be transmitted to the interface between the thrust bearing and its adjacent bearing runner in a direction opposite to the shaft's axial loading.

FIG. 1 illustrates a rotating machine in which a rotor shaft 10 rotates about an axis of rotation A which is coincident with its center line. The machine illustrated in FIG. 1 is subjected to an axial force (illustrated by arrow N) during normal operation. A shaft runner 12 is rigidly attached to the shaft 10 by a locking key 16 and a lock nut 14 which can operate in conjunction with a lock washer. The shaft runner 12 is connected to a bearing runner 18. The operational surface 20 of the bearing runner 18 resists the external force N on the shaft 10. It should be understood that the present invention is applicable to apparatus which is subjected to a force in other than the upward direction as shown in FIG. 1. A common application could be used to support the weight of a shaft which is directed in a downward direction.

A pair of anti-friction guide bearings, 22 and 24, transmit an axial force to the shaft 10 when the present invention is activated. The anti-friction bearings 22 and 24 are attached to the shaft runner 12 by means of a press fit and a lock nut 26 which can be associated with a lock washer.

A piston 30 and piston thrust plate assembly 32 are disposed in such a way that they are able to provide an axial force on the anti-friction bearings, 22 and 24, when the piston 30 is subjected to a force in the opposite direction of the axial loading normal force N. The piston 30 is disposed in a cylinder 134 which is shaped to receive the piston in sliding relation. The shape of the cylinder 134 provides a space 136 into which high pressure oil can be injected. The cylinder 134 is provided with a means for injecting this oil, from an external source, in the direction of the arrows P. The cylinder 134 is provided with this means, such as the fitting 138, for introducing the oil into the space 136.

As illustrated in FIG. 1, the upper portion of the shaft 10 along with its anti-friction guide bearings 22 and 24 are enclosed in a guide bearing housing assembly 140, which is attached to a thrust bearing thrust plate 142 to provide axial support for the thrust bearing 144.

The thrust bearing 144 can be any suitable type of bearing, such as a Kingsbury-type bearing, which is suitable for providing axial support to the bearing runner 18. The thrust bearing 144 is enclosed by a thrust bearing housing 146 which, in turn, is supported by a bearing bracket 148. Also shown in FIG. 1 is a section of a cover 150, which can be any suitable shape which is dependent on the overall configuration of the thrust bearing assembly. Also disposed around the shaft 10 is a standpipe 151 and a stand-pipe adapter 152. These components permit the bearing runner 18 and the thrust bearing 144 to be immersed within a lubricating medium, particularly the surface 20 along which the runner 18 and thrust bearing 144 are in contact along an interface therebetween.

During initial start-up of the rotational machine, oil is pumped through the fitting 138 and into the space 136 above the piston 30. The increased pressure within the space 136 exerts a force (downward in FIG. 1) on the piston 30. This force is transmitted, through the piston thrust plate 32, to the anti-friction guide bearings 22 and 24. This force is further transmitted through the anti-friction bearing 24 to the shaft runner 12 and, in turn, to the bearing runner 18. As the oil pressure in the space 136 is increased, the bearing runner 18 is forced in a direction away from the thrust bearing 144. It should be understood that the bearing runner 18 and the axial bearing 144 may, in actual practice, remain in contact throughout the start-up operation with no actual parting at their interface. In other words, the bearing runner 18 need not actually lift away from the thrust bearing 144 in order for the present invention to work properly. All that is required for the present invention to facilitate a start-up of the rotational machine is a reduction of the normal force along the surface 20 between the runner 18 and the thrust bearing 144. It should be further understood that this normal force need not be reduced to zero at which point the bearing runner 18 and thrust bearing 144 would part along the surface 20. Instead, all that is needed for a start-up procedure is a reduction of the force between the thrust bearing 144 and bearing runner 18 to a level which, in conjunction with the coefficient of friction between these two components, reduces the friction force F of equation 1 and, therefore, the required torque for start-up.

It should further be understood that, although the force N in the illustration shown in FIG. 1 is shown as being directed upward, this is not a requirement for utilization of the present invention. For example, if the force N was in another direction, the components of the present invention would be arranged in such a way that an increased oil pressure in the space 136 would cause the piston 30, piston thrust plate assembly 32, guide bearings 22 and 24, shaft runner 12 and bearing runner 18 to be forced in a direction which is opposite to the direction of the force N.

Figure 2:
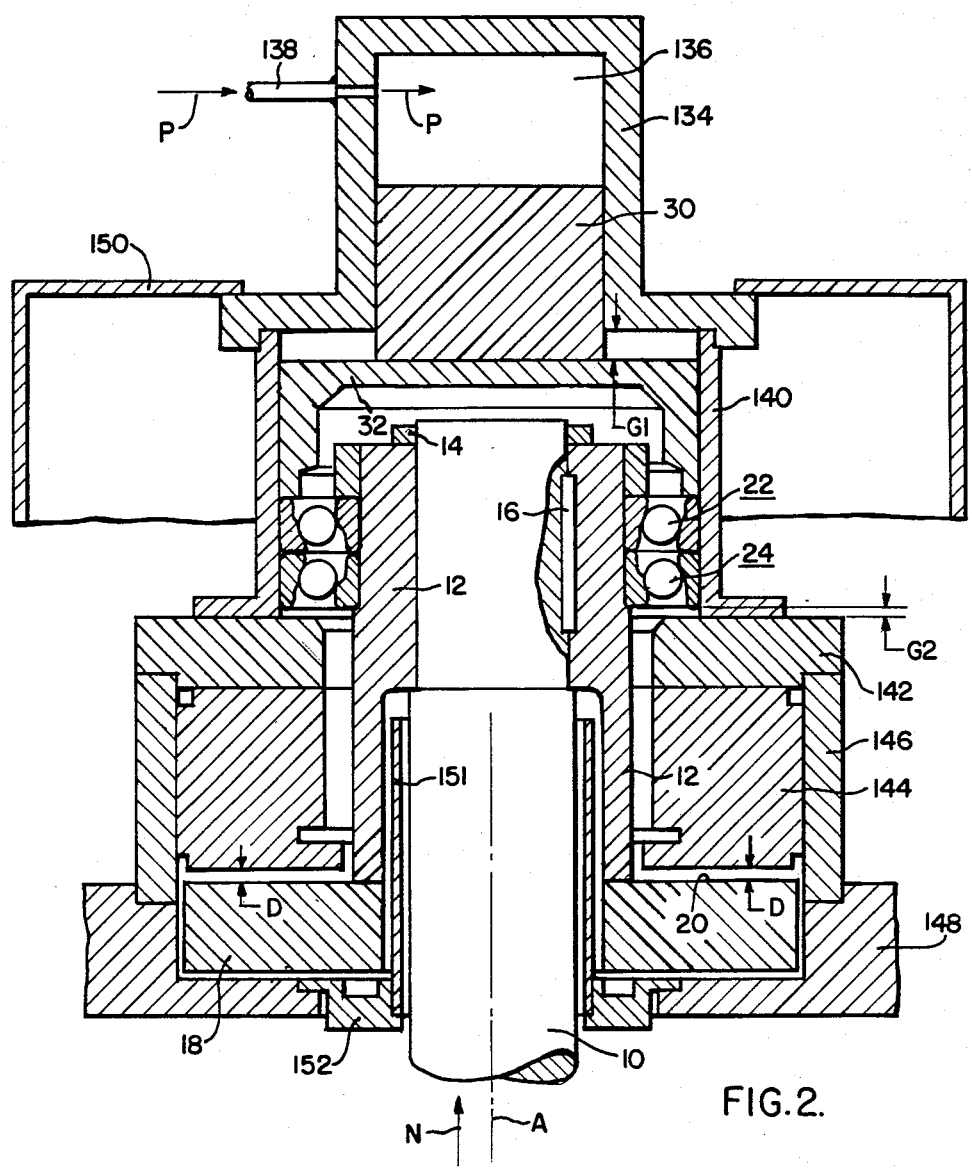
FIG. 2 illustrates the present invention being activated in order to reduce the normal force between a thrust bearing and its associated runner.

FIG. 2 illustrates the thrust bearing assembly, shown in FIG. 1, in an activated state during the start-up procedure. It should be understood that the relative movement of the components shown in FIG. 2 which will be described below have been exaggerated in order to illustrate the possible relative movement of the components of the present invention to more clearly describe the transmission of forces during a start up procedure.

Referring to FIG. 2, oil is pumped through the fitting 138 and into the space 136 above the piston 30. This increase in oil pressure in the space 136 causes the piston 30 to attempt to move in a direction opposite that of the force N. This exemplary axial movement of the piston 30 and the piston thrust plate assembly 32 can be seen by comparing the distance (reference numeral G1 in FIG. 2) between the cylinder 134 and the piston thrust plate assembly 132 with its corresponding size shown in FIG. 1. This axial force and its corresponding potential axial movement is transmitted through the piston thrust plate assembly 32 to the anti-friction guide bearings, 22 and 24. Also for purposes of reference, the space (reference numeral G2 in FIG. 2) between the anti-friction guide bearing 24 and the thrust bearing thrust plate 142 can be similarly compared to its relative size in FIG. 1. The force is then transferred to the shaft runner 12 and the bearing runner 18. In FIG. 2, this force is shown as causing the bearing runner 18 to move away from the thrust bearing 144 to create a gap (reference D in FIG. 2). As discussed above, the creation of the gap D is not a necessity to the proper operation of the present invention. The operational surface 20 of the bearing runner 18 need not move away from its adjacent surface of the thrust bearing 144. All that is required for the proper operation of the present invention is for the force between the bearing runner 18 and thrust bearing 144 to be reduced from its initial magnitude, which is equal to the force N on the shaft 10.

Figure 3:
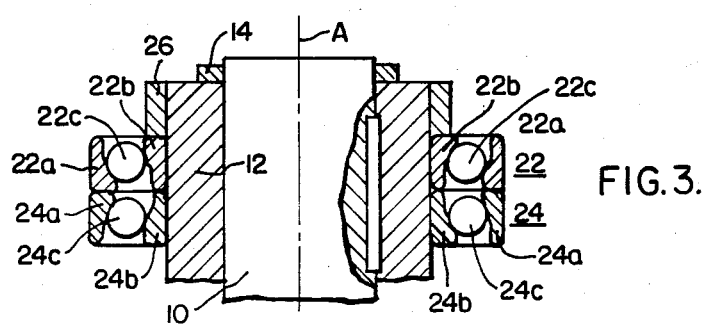
FIG. 3 is a schematic illustration of one particular type of frictionless bearing associated with the shaft runner of the present invention.

FIG. 3 is a detailed illustration of the anti-friction bearings (reference numerals 22 and 24 of FIGS. 1 and 2). This figure is intended to more particularly show the components of these bearings in one particular embodiment, namely ball bearings. The upper anti-friction bearing 22 is shown having an outer 22a and an inner 22b race with a rotatable ball 22c disposed therebetween. Similarly, the lower anti-friction bearing 24 is shown having an outer 24a and an inner 24b race with a rotatable ball 24c therebetween. These bearings are pressed onto the shaft runner 12 and retained in place by a lock washer 26. A downward force on their respective outer races will result in a downward force being transmitted, by their inner races, to the shaft runner 12. As shown, these anti-friction bearings also provide radial support to the shaft runner 12 besides the axial support described above. It should be understood that this particular type of anti-friction bearing typically employs an internal cage construction to prevent the balls from migrating from their predetermined circumferential spacing. It should further be understood that, although this particular embodiment is shown with two ball-bearing components, other quantities and types of bearings should be considered within the scope of the present invention.

By comparing FIGS. 1 and 2, it should be apparent that the normal force N between the bearing runner 18 and its adjacent thrust bearing 144 is significantly reduced by the action of the piston 30 along with its associated axially movable components. This reduction in normal force between the bearing runner 18 and the thrust bearing 144 results in a corresponding reduction in its frictional force and in the required torque to cause the shaft 10 to begin rotation. Since this minimum required torque is a direct function of both the normal force between the bearing runner 18 and thrust bearing 144 and the coefficient of friction therebetween, a reduction in the normal force results in a corresponding reduction of the required torque.

It should be apparent to one skilled in the art that the present invention provides a way for temporarily reducing the force between a thrust bearing and its associated bearing runner in order to reduce the torque requirements of a motor which is utilized to begin the rotation of the bearing runner. It should be understood that, although the present invention has been described in considerable detail in the figures and above discussion, it should not be considered to be so limited. It should further be understood that, although the present invention has been described particularly with reference to antifriction guide bearings and Kingsburg-type thrust bearings, it can be utilized in systems which use alternative components. Similarly, although the preferred embodiment comprises a hydraulic piston, other means for imparting an axial force on the shaft, such as a mechanical linkage or a spring mechanism, should be considered within the scope of the present invention. Furthermore, although the discussion and illustration have been directed to a thrust bearing assembly in which the shaft loading has been in an upward direction, it should be understood that the present invention can be utilized on systems in which the shaft experiences loads in alternative directions.

What I claim is:

1. A vertical axis machine comprising:
   a rotor shaft subjected to an axial force;
   a shaft runner located around and locked to a portion of said shaft;
   a bearing runner connected to said shaft runner and extending radially outward from said shaft, said bearing runner having a bearing surface located in a plane perpendicular to said axis;
   a thrust bearing member disposed in a fixed axial location to run on said bearing surface;
   means for relieving force between said bearing runner and said thrust bearing member during start up of the machine comprising (a) additional bearing means, for running said shaft runner in relation to a housing member fixed to said thrust bearing member, comprising at least one ball bearing having an outer race joined to said housing member, an inner race joined to said shaft runner, and a plurality of rotatable balls between said outer race and said inner race, (b) a hydraulically operated piston in a cylinder located directly axial of said shaft, and (c) a piston thrust plate located axially between said piston and an end of said shaft to move in response to axial motion of said piston and to apply force to said additional bearing means, which force is transmitted to said shaft runner and said bearing runner to relieve the axial force between said bearing runner and said thrust bearing member at said bearing surface, said piston, said piston thrust plate, said ball bearing, said shaft runner, and said bearing runner are arranged for axial force transmission from said piston to, in sequence, said piston thrust plate, said ball bearing outer race, said rotatable balls, said ball bearing inner race, said shaft runner, and said bearing runner.

* * * * *